(12) United States Patent
Ahorner et al.

(10) Patent No.: US 10,300,560 B2
(45) Date of Patent: May 28, 2019

(54) METHOD FOR PRODUCING A PRELIMINARY MATERIAL FOR A MACHINING TOOL, AND CORRESPONDING PRELIMINARY MATERIAL

(71) Applicant: Voestalpine Precision Strip GmbH, Boehlerwerk (AT)

(72) Inventors: Leander Ahorner, Waidhofen/Ybbs (AT); Gerhard Mayrhofer, Strengberg (AT); Markus Neswadba, Kematen/Ybbs (AT)

(73) Assignee: Voestalpine Precision Strip GmbH, Boehlerwerk (AT)

( * ) Notice: Subject to any disclaimer, the term of this patent is extended or adjusted under 35 U.S.C. 154(b) by 0 days.

(21) Appl. No.: 15/039,178

(22) PCT Filed: Nov. 25, 2014

(86) PCT No.: PCT/EP2014/075565
§ 371 (c)(1),
(2) Date: May 25, 2016

(87) PCT Pub. No.: WO2015/075267
PCT Pub. Date: May 28, 2015

(65) Prior Publication Data
US 2017/0021459 A1    Jan. 26, 2017

(30) Foreign Application Priority Data
Nov. 25, 2013   (EP) .................................... 13194243

(51) Int. Cl.
*B23K 31/02*   (2006.01)
*B23D 65/00*   (2006.01)
*B23K 101/20*  (2006.01)

(52) U.S. Cl.
CPC ............ *B23K 31/022* (2013.01); *B23D 65/00* (2013.01); *B23K 2101/20* (2018.08)

(58) Field of Classification Search
None
See application file for complete search history.

(56) References Cited

U.S. PATENT DOCUMENTS

| 2,683,923 A | 7/1954 | Replogle |
| 2,686,439 A | 8/1954 | Tobert |

(Continued)

FOREIGN PATENT DOCUMENTS

| AT | 154337 | 9/1938 |
| CN | 1554803 A | 12/2004 |

(Continued)

OTHER PUBLICATIONS

International Search Report dated Jan. 29, 2015 in PCT/EP2014/075565 Filed Nov. 25, 2014.

*Primary Examiner* — Devang R Patel
(74) *Attorney, Agent, or Firm* — Oblon, McClelland, Maier & Neustadt, L.L.P.

(57) ABSTRACT

A method for producing a preliminary material for a cutting tool and such a preliminary member, for example a preliminary material for a saw blade, a saw band, a cutting line, a punching knife, or a blade, wherein at least one first particulate cutting-edge material is applied to a planar carrier, the first particulate cutting-edge material is welded to the planar carrier, and the planar carrier is separated substantially along the weld joint thus produced.

12 Claims, 3 Drawing Sheets

(56) References Cited

U.S. PATENT DOCUMENTS

| | | | |
|---|---|---|---|
| 3,593,600 A * | 7/1971 | Adams, Jr. | B23D 61/125 219/50 |
| 3,835,734 A | 9/1974 | Arthur et al. | |
| 4,488,882 A * | 12/1984 | Dausinger | B23K 31/025 264/101 |
| 4,644,127 A | 2/1987 | La Rocca | |
| 7,451,678 B2 * | 11/2008 | Dion | B23D 61/12 83/835 |
| 8,076,607 B2 * | 12/2011 | Lentz | B23K 26/0078 219/121.64 |
| 8,291,602 B2 * | 10/2012 | Korb | B21D 53/64 30/350 |
| 2004/0016132 A1 | 1/2004 | Dion et al. | |
| 2004/0237722 A1 * | 12/2004 | Ponemayr | B22F 7/08 76/112 |
| 2004/0250881 A1 * | 12/2004 | Soga | B23P 15/28 144/85 |
| 2007/0163128 A1 * | 7/2007 | Tarrerias | B23D 65/00 30/350 |
| 2008/0072411 A1 * | 3/2008 | Ahorner | B23D 61/12 29/415 |
| 2008/0277454 A1 | 11/2008 | Dion et al. | |
| 2008/0280157 A1 | 11/2008 | Dion et al. | |
| 2009/0114064 A1 * | 5/2009 | Ahorner | B23D 65/00 76/112 |
| 2009/0314136 A1 | 12/2009 | Culf | |
| 2012/0060379 A1 * | 3/2012 | Culf | B23P 15/40 30/350 |

FOREIGN PATENT DOCUMENTS

| | | |
|---|---|---|
| CN | 1917980 A | 2/2007 |
| JP | 2005-534532 | 11/2005 |
| JP | 2010 000596 A | 1/2010 |
| JP | 2013-503754 A | 2/2013 |
| WO | 2006/000256 A1 | 1/2006 |
| WO | WO 2011/02074 A2 | 3/2011 |

* cited by examiner

METHOD FOR PRODUCING A PRELIMINARY MATERIAL FOR A MACHINING TOOL, AND CORRESPONDING PRELIMINARY MATERIAL

The present invention relates to a method for producing a preliminary material for a machining tool, in particular a preliminary material as a starting component for producing a saw blade, a saw band, a cutting line, a punching knife or a blade, for example a stripping blade. The invention also relates to a corresponding preliminary material.

Machining tools, such as for example band saws for metal working, must meet a whole series of requirements in order to be economically usable. The band material must be flexible and elastic, it must not only be able to absorb and withstand the tensile stresses to which the saw band is already exposed before it is fitted but it must also additionally be able to withstand the flexural forces to which the band is subjected during the sawing process and the corresponding torsional moments and stresses that the band experiences during the turning about its longitudinal axis above and below the cutting table or before and after the cutting location. In addition to this there are dynamic loads, which are caused by the engagement of the individual teeth in the material to be worked, not least thermal loads due to temperatures, which can reach 600° C. and more in the region of the teeth and in particular at the tips of the teeth. Since the cooling of the band causes this heat to be removed, there is not only this thermal loading, but also the formation of a temperature gradient and the associated thermal stresses, which overlay the mechanical stresses and in particular the dynamic stresses.

Since the requirements with regard to toughness and bending strength of the saw band on the one hand and hot hardness and wear resistance of the saw teeth on the other hand can only be satisfied insufficiently by a single material, for example a metal or a metal alloy, so-called bimetallic bands or bimetallic sheets are used with preference as the starting component or preliminary material for high-performance machining tools. Such bimetallic bands or sheets usually consist of a sheet-like base of a base material, which has the necessary toughness and flexural strength for the later machining tool, for example of low-alloy steels or else of carbon steel. Usually, a wire of a cutting-edge material, which has a greater wear resistance and a greater hot hardness, is welded onto a narrow edge of the sheet-like base. An edge wire of high-speed steel (HSS) is typically used as the cutting-edge material.

The saw manufacturer then produces the saw blade or saw band from this preliminary material. For this purpose, the tooth profile of the later saw blade or saw band is fashioned, for example milled or ground out, at the edge of the sheet-like base at which the welded high-speed steel wire is located. This has the effect of creating teeth with a pointed region of high-speed steel, while the rest of the saw blade or band consists of the tough, elastic steel of the sheet-like base. Depending on the set of requirements for the saw, the teeth may consist completely of cutting-edge material, but with preference only the tips of the teeth consist of cutting-edge material, while the foot of the teeth reaches into the sheet-like base and consequently consists of the tough, elastic base material.

However, such a conventionally produced bimetallic band or sheet has the disadvantage that the fashioning of the tooth profile involves a considerable loss of cutting-edge material, since the material from the spaces between the teeth cannot be put to any other use. To solve this problem, it has been proposed for example in this applicant's international patent application WO 2006/000256 A1 to use a preliminary material which consists of two sheet-like bases that are connected to one another by means of an edge wire of a high-speed steel for producing saw blades or saw bands. By suitable choice of a separating line, this composite can be separated so as to produce two bimetallic bands of which the edge profile already corresponds approximately to the tooth profile of the later saw blade or band. After separation, each bimetallic band is re-worked until the ultimately desired form of the teeth is achieved. In this way, the loss of material in terms of cutting-edge material is lower.

However, the methods described so far still have the disadvantage that the cutting-edge material used must on the one hand be able to be produced in the form of edge wires and on the other hand must be able to be welded to the sheet-like base. These preconditions considerably restrict the choice of materials both for the sheet-like base and for the cutting edges.

In the U.S. Pat. No. 7,373,857 B2, a description is given of a method for producing a machining tool where a sheet-like composite material of different metal alloys is likewise used. In this case, a wire of cutting-edge material is placed into a groove cut into a sheet-like base and is embedded in by pressure and heat treatment. Although this method has cost advantages, since for example round wire can be used instead of edge wire, here too the choice of material is restricted, since on the one hand the cutting-edge material has to be in the form of wire and on the other hand not every combination of cutting-edge material and material of the sheet-like base allows a sufficiently stable connection of the two materials. A similar method is also described in US patent application US 2004/016132 A1, wherein a wire that later forms the edge element of a bimetallic band is embedded in a depression of a base band. It is mentioned that the wire which later forms the edge element may be produced from a high-speed steel, including powder-metallurgically produced metals.

In U.S. Pat. No. 2,686,439 A there is a description of a method for producing a cutting tool in which a powdered cutting material (hard metal) is introduced into depressions of a base material. The entire arrangement is clad with a further metal and subsequently brought into the desired form. Then, the arrangement is heated above the sintering temperature of the hard metal and any protective metal casing is removed.

In U.S. Pat. No. 3,835,734 A there is a description of a method in which a powdered tool steel in a pre-compacted form is inserted into a container of low-alloy steel and is transformed into a bimetallic body by hot-isostatic pressing and subsequent hot rolling or hot cladding. A component in the form of a band with a cutting edge of tool steel is produced by machining.

However, none of the documents U.S. Pat. No. 7,373,857 B2, US 2004/016132 A1, U.S. Pat. Nos. 2,686,439 A and 3,835,734 A describe welding powdered cutting-edge material to the base material. EP 1 404 484 B1 discloses a method for producing a machining tool consisting of a base material in the form of a band or sheet, on the substantially upright edge of which a cutting-edge region is applied in the form of a powdered alloy and in the course of being applied is melted by means of a laser beam and solidified on the edge. With this method, a much greater number of cutting-edge materials are available, since the precondition that the cutting-edge material can be produced as edge wire or round wire is no longer applicable. However, the disadvantage of producing the cutting-edge region by powder metallurgy is that the achievable speed of the process is lower than when welding an edge wire.

The present invention is therefore based on the technical problem of providing a method for producing a preliminary material for a machining tool that can be realized inexpensively and easily and allows the use of a great variety of materials for the sheet-like base and the cutting-edge material. Furthermore, a corresponding preliminary material for producing a machining tool is to be provided.

The technical problem is solved by the method for producing a preliminary material for a machining tool according to the present claim 1; advantageous developments of the method are the subject of the dependent claims.

The invention accordingly relates to a method for producing a preliminary material for a machining tool, in particular a preliminary material for a saw blade, a saw band, a cutting line, a punching knife or a blade, wherein at least a first particulate cutting-edge material is applied to a sheet-like base, the first particulate cutting-edge material is welded to the sheet-like base, and the sheet-like base is separated substantially along the welded connection thus produced. The particulate cutting-edge material is thereby applied to a surface on the upper side and/or the underside of the sheet-like base. Welding has the effect that an alloying zone comprising the material of the sheet-like base and the particulate cutting-edge material is respectively created in the contact region between the sheet-like base and the particulate cutting-edge material. In the simplest case, separating the two sheet-like bases may take place along a straight center line through the welded connection created. However, the separating line does not have to run exclusively in the welded connection, but may also have a more complicated form, and possibly also reach partially into the sheet-like base, in order that the separation already produces an edge profile that approximates to the desired later form of the teeth.

The method according to the invention has numerous advantages. Since the cutting-edge material is applied in the form of particles, there is no restriction in the choice of cutting-edge material to materials that can be produced as wire. Even when using materials that are in principle also obtainable as wire, there is a great cost advantage in using a particulate material, in particular a powdered material, since the costs involved in producing the wire are no longer applicable. Furthermore, the limitation on the speed of the process that producing the cutting-edge region by powder metallurgy entails is lessened by the fact that, with the method according to the invention, after separation of the welded connection two bimetallic bands or sheets that have been produced by a single welding operation are created. Effectively, the speed of the process is therefore doubled in comparison with the method known from EP 1 404 484 B1. The effective speed of the process can be increased still further by using a wider sheet-like base and producing one or more further corresponding welding lines, and subsequently separating the sheet-like bases into multiple bimetallic bands.

The particulate base material can be applied directly to a substantially flat surface of the sheet-like base and welded to the base material. However, on the one hand this results in quite a high weld ridge, which generally has to be reworked, and on the other hand there is still a significant proportion of base material under the welded connection, which, depending on the base material used, may be undesired in the cutting-edge region that is created after separation of the sheet-like base. Preferably, therefore, the at least one, first particulate cutting-edge material is introduced into a depression cut out on the upper side and/or the underside of the sheet-like base. Thus, after the two bases are separated along the welded connection, an edge region which then almost only consists of cutting-edge material is created, so that tooth tips that likewise only consist of cutting-edge material can be fashioned during the later further processing. Furthermore, the weld elevation created is reduced, so that further working is made easier. The depression may have any desired cross-sectional form, such as round, oval or angular.

The sheet-like base may be of any desired form that is suitable for creating a machining tool such as a saw blade, a saw band, a cutting line or a punching knife or a blade during the later further processing. With particular preference, however, in the method according to the invention the sheet-like base is provided in the form of a band of metal or a metal alloy, in particular a continuous band, that is for example unwound from a spool and supplied to a welding device.

The sheet-like base and the particulate cutting-edge material may be welded to one another in a wide variety of ways, for example in that the sheet-like base and/or the first particulate cutting-edge material is/are at least partially melted and the molten material composite is left to solidify at least partially. Typically, at least one of the materials involved, for example the base material, is melted in the region where the particulate cutting-edge material is supplied, so that a material composite of base material and the supplied particulate cutting-edge material is created during the solidification. The cutting-edge material itself may likewise melt, but it may also become incorporated as particulate cutting-edge substance in the welding region. The matrix in which the particulate cutting-edge material becomes incorporated may be a material that is supplied together with the particulate cutting-edge material and itself melts when energy is applied. Alternatively, the material of the sheet-like base may serve as a matrix for a non-melting particulate cutting-edge material. However, a particulate cutting-edge material that itself melts during the welding to the sheet-like base is used with preference.

As a final step of the method according to the invention, numerous separating methods that are known from the prior art, such as cutting, gap cutting, punching, laser cutting, waterjet cutting or the like, may be used for separating the welded connection thus established.

The sheet-like base preferably consists of a main body of a base material, for example a metal or a metal alloy, for example a low-alloy tool steel. Then, with the method according to the invention, supplying the particulate cutting-edge material produces a corresponding high-strength cutting-edge region, which after the separation of the sheet-like base then forms the edges of the separated parts created.

The sheet-like base that is used in the method according to the invention may, however, already have in addition to the main body of the usual base material a region that consists of a further cutting-edge material. Such a sheet-like base may be for example a base with a central strip of high-speed steel, as described in the applicant's WO 2006/000256 A1. Consequently, an additional region of first particulate cutting-edge material is added to the region of further cutting-edge material of the sheet-like base by the method according to the invention, so as to produce a multilayered band. The first and second cutting-edge materials are preferably different materials.

Alternatively or in addition, before separating the composite comprising the sheet-like base and the first cutting-edge material, at least a second particulate cutting-edge material may be supplied and melted, in order in this way to produce a two-layered or three-layered composite material. This process can of course also be continued in multiple stages with further particulate cutting-edge materials, in order to produce a multilayered composite material.

The first particulate cutting-edge material and possibly the second particulate cutting-edge material or the further particulate cutting-edge materials are preferably supplied in the form of a powder, granules, a paste or a filling wire. In the case of a filling wire, the particulate cutting-edge material in the form of a powder, granules or a paste is located inside a tubular wire. The wire itself may for example consist of the material of the base. It is, however, particularly preferred for it to be supplied in the form of a powder.

The particulate cutting-edge material may be supplied in a wide variety of ways. If the particulate cutting-edge material is in the form of powder or a paste, it may be supplied by means of a nozzle, for example an annular nozzle or a slit nozzle. If the particulate cutting-edge material is in the form of a filling wire, it may be supplied for example from a storage spool.

The cutting-edge materials used preferably contain metals and/or metal alloys, for example metals or metal alloys that themselves melt during the welding process, such as for example high-speed steel (HSS).

All common HSS materials that are already used as wire for bimetal for saw blades or saw bands may for example be used as particulate cutting-edge materials (by way of example S 2-10-1-8 (M42, 1.3247) or S 6-5-2 (M2, 1.3343)). In addition, all other HSS materials that are not available as wire may also be used in the method according to the invention. Here, the alloy composition may go in the direction of 0.5-2.5% C, 0.1-1.0% Si, 0.1-0.7% Mn, 3.0-6.0% Cr, 2.0-11% Mo, up to 6.5% V, up to 15% W, to 15% Co. Furthermore, carbide-forming elements such as Nb and Ti may be added, with a percentage content of 5%.

Alternatively or in addition, the cutting edge materials may also contain metallic hard materials. Metallic hard materials are borides, carbides, silicides and nitrides of high-melting transition metals, or else oxides in combination with workable microstructural constituents, i.e. a matrix in which the metallic materials are incorporated. Metallic hard materials include, for example, TiC, TaC, WC, $TiB_2$, $MoSi_2$, $Al_2O_3$, $SiO_2$), from which solid solutions (for example TiC—WC, $Mo_2C$—TiC), double carbides or complex carbides (for example $Co_3W_3C$, $Ni_3W_3C$) and intermetallic compounds can be derived. Furthermore, mixtures of HSS materials with metallic hard materials also come into consideration. New cutting-edge substances obtained by mechanical alloying are of course similarly conceivable. The ternary systems Fe—Co—Mo and Fe—Co—W and the quaternary system that can be derived therefrom Fe—Co—Mo—W also come into consideration as cutting-edge material. These systems may form very fine precipitates in the course of precipitation hardening, which leads to an enormous increase in hardness. In the solution-annealed state, such alloys are correspondingly soft and can also be cold-worked. Usual alloy constituents of such precipitation hardenable alloys are in the range of 23-25% Co and a W+Mo/2 combination of 10-31%. Fe and smelting-induced impurities form the remainder.

In the method according to the invention, all common backing materials come into consideration as base materials. For example, usual low-alloy steels, which have great toughness and fatigue strength, may be used. Suitable sheet-like bases have for example a chemical composition in the range of 0.2-0.6% C, 0.1-1.0% Si, 0.3-2.0% Mn, 0.5-7.0% Cr, 0.1-2.6% Mo, up to 0.6% V and up to 5.0% W. Small additions of Nb and Ti in the range of up to 0.5% in total may be admixed for grain refinement. Iron and smelting-induced impurities form the remainder. Carbon steel with 0.50 to 1.50% C, up to 1.5% Si and up to 1.5% Mn may be used as the base material.

The sheet-like base and the particulate cutting-edge material are welded to one another by heating the connecting region and suitably supplying energy, possibly while applying pressure. The energy is supplied for example by means of a welding device. The supply of energy must be sufficient to melt at least one of the materials involved. Preferably, the sheet-like base and the particulate cutting-edge material are welded to one another by supplying energy by means of one or more lasers. However, the energy may also be supplied in some other way, for example by electron beams. In particular, when the particulate cutting-edge material is supplied in the form of a paste or a filling wire, any other conventional welding device, for example an arc or inert-gas welding device or a resistance welding device, may also be used.

Depending on the later intended use, the particulate cutting-edge material may only be supplied on one side of the surface of the sheet-like base. Preferably, however, the sheet-like cutting-edge material is applied on both sides of the sheet-like base, that is to say on the upper side and the underside of the sheet-like base. This may take place simultaneously or successively, for example the sheet-like base may be arranged vertically in the region of the welding device and the particulate cutting-edge material supplied simultaneously from both sides. In the case of a horizontal arrangement of the sheet-like base in the welding region, the sheet-like base may be guided over a deflecting roller after application of the particulate cutting-edge material on the upper side, so that in a compact region of the process line the underside of the base is upwardly directed and ready for the cutting-edge material to be applied. In particular if the sheet-like base takes the form of a band, it is for example also conceivable to turn the band through an angle of 180° after applying the particulate cutting-edge material on the upper side over a certain running length of the band, so that a little further downstream the original underside of the base is upwardly directed.

The invention also relates to a sheet-like preliminary material for producing a machining tool, in particular a saw blade, a saw band, a cutting line or a punching knife, that is obtainable by the method described above.

According to a first variant, the sheet-like preliminary material according to the invention comprises a sheet-like base, which has a main body of a base material, and a cutting-edge region of at least a first cutting-edge material, the sheet-like base and the cutting-edge region being connected to one another by way of a first alloying zone. By the method according to the invention, the first cutting-edge material is applied in the form of particles to the sheet-like base in such a way that the cutting-edge region created and the sheet-like base overlap over a cross-sectional length l that lies in the range of 0.2-3 times the cross-sectional width b of the sheet-like base. Preferably, the cutting-edge region created and the sheet-like base overlap over a cross-sectional length l that lies in the range of 0.3-2 times, with particular preference in the range of 0.5-1.5 times, the cross-sectional width b of the sheet-like base. By contrast with a conventional bimetallic band produced from edge wire, there is therefore no definite height in the cross section of the preliminary material according to the invention at which the original sheet-like base goes over into the edge region that is created from the cutting-edge material originally supplied in the form of particles. Rather, for example, the sheet-like base reaches further into the edge region in the interior of the sheet-like preliminary material than in the outer region on the upper side and/or the underside.

The sheet-like base may consist of a main body of base material. Alternatively, the sheet-like base may comprise a main body of base material and an edge region of at least one further cutting-edge material, so that with the method according to the invention a multilayered preliminary material is created. The sheet-like base may therefore also have originated from the base with a central strip of high-speed steel according to WO 2006/000256 A1.

According to a variant of a multilayered preliminary material, the sheet-like preliminary material according to the invention comprises a sheet-like base, which has a main body of a base material, and a cutting-edge region of at least one cutting-edge material, the cutting-edge region having at at least one corner a corner region of at least one other cutting-edge material. This variant of the preliminary material is characterized in that the corner region and the cutting-edge region are connected to one another by way of an alloying zone. This allows the teeth to be further optimized, in that for example corners with a particularly great wear resistance and in particular cutting strength can be produced, while the middle region of the teeth has a greater toughness and flexural strength than the corners, but at the same time still a greater wear resistance than the material of the main body. The other cutting-edge material for the corner region is in this case supplied by the method according to the invention. The cutting-edge region of the at least one cutting-edge material may have been produced by the method according to the invention from a first particulate cutting-edge material, or may consist of a further cutting-edge material, which has for example originated from the base with a central strip of high-speed steel according to WO 2006/000256 A1. Consequently, here too, the sheet-like base may also consist of a main body of base material or additionally comprise an edge region of at least one further cutting-edge material.

This variant of the multilayered preliminary material according to the invention can also be produced by a method in which a sheet-like base, which comprises a main body of base material and a cutting-edge region of cutting-edge material, is provided, at least one particulate cutting-edge material is applied to at least one edge of the cutting-edge region of the sheet-like base, and the particulate cutting-edge material is welded to the sheet-like base. The cutting-edge region of cutting-edge material of the sheet-like base may have been produced by the method according to the invention from a first particulate cutting-edge material or it may consist of a further cutting-edge material, which has for example been welded onto the main body as edge wire. By contrast with the powder-metallurgical production of a cutting edge known from the prior art, in the case of the method according invention a particulate, in particular powdered, cutting-edge material is not applied to the base material but to a cutting-edge region that is already present at the edge of the sheet-like base. With particular preference, the particulate cutting-edge material is applied to the corners of the cutting-edge region of the sheet-like base, which in turn makes it possible to produce corners with particularly great wear resistance and cutting strength.

With particular preference, the sheet-like preliminary material according to the invention is a band. By the method according to the invention, such a band may be wound up in the form of a coil for further processing and be delivered for example to a saw manufacturer.

The invention is explained in more detail below with reference to the accompanying drawings.

Figure 1:
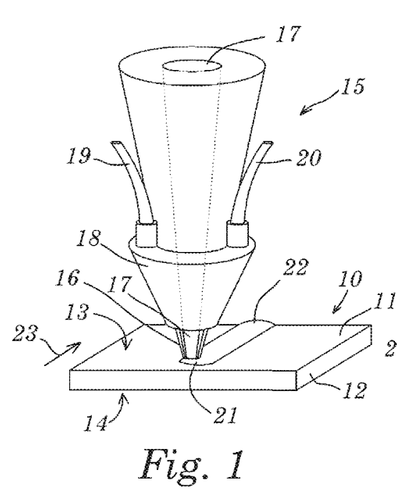
FIG. 1 shows a schematic representation of the production of a welded connection between a sheet-like base and supplied particulate cutting-edge material in the method according to the invention.

In FIG. 1, a first embodiment of the method according to the invention for producing a preliminary material for a machining tool, for example a preliminary material for a saw blade, a saw band or a cutting line, is schematically shown by way of example. A sheet-like base 10 can be seen, in the example shown merely comprising a unitary main body 11 of a base material. To provide a better overview, in the example shown the sheet-like base is shown as a short portion. Preferably, however, it is a continuous band, which is for example unwound from spools, which are likewise not shown here. The sheet-like base 10 has an upper side 13 and an underside 14, which in the example shown are flat. By means of a welding head 15 of a welding device that is not shown any further, a first particulate cutting-edge material 16 is applied to the upper side 13 of the sheet-like base 10 and melted by means of a laser beam 17, so that the base 10 and the particulate cutting-edge material 16 can be welded to one another. In the example shown, the welding head 15 of the welding device has for this purpose an annular nozzle 18, to which the particulate cutting-edge material 16 is supplied by means of lines 19, 20. However, any other kind of nozzle may also be used. The annular nozzle 18 shown produces a conical jet of the particulate cutting-edge material 16, which is directed onto the upper side 13 of the base. The laser beam 17 is made to pass through the center of the welding head 15 and the center of the conical jet of the cutting-edge material 16 and is focused onto a region 21 in which the cutting-edge material impinges on the surface of the base 10. In this region, the welding process takes place. Depending on the materials used, the particulate cutting-edge material 16 and/or a matrix material supplied together with the cutting-edge material and/or the base material in the welding region 21 are at least partially melted, so that a welded connection 22 is created.

The sheet-like base, i.e. in the example shown the continuous band, is moved under the stationary welding head 15 along the arrow 23.

Figure 2:
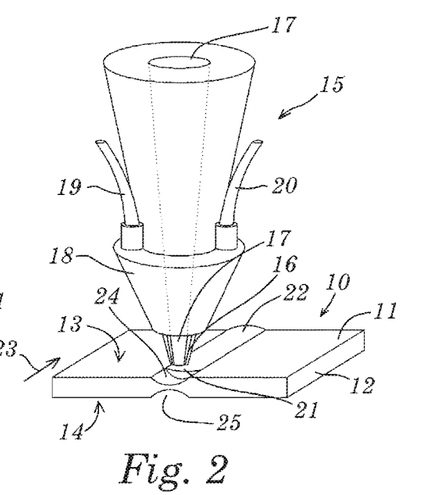
FIG. 2 shows a variant of FIG. 1 in which the sheet-like base has depressions for receiving the particulate cutting-edge material.

FIG. 2 shows a variant of the embodiment of FIG. 1 in which the sheet-like base has depressions 24, 25 for receiving the particulate cutting-edge material. Elements that correspond to the elements already described in conjunction with FIG. 1 are designated by the same reference numerals. In the case of this variant, the sheet-like base 10 has on its upper side 13 a rounded depression 24 and on its underside a rounded depression 25. The depressions 24, 25 on the one hand reduce the weld ridge of the welded connection 22 beyond the surface of the sheet-like base 10, so that the re-working effort, and in particular the loss of cutting-edge material during the re-working, is reduced. On the other hand, the thickness of the base material 12 in the welding region 21 is reduced, so that, as explained in more detail further below, an edge region that substantially consists of cutting-edge material 16 is created after separating the welded connection.

Figures 3, 4:
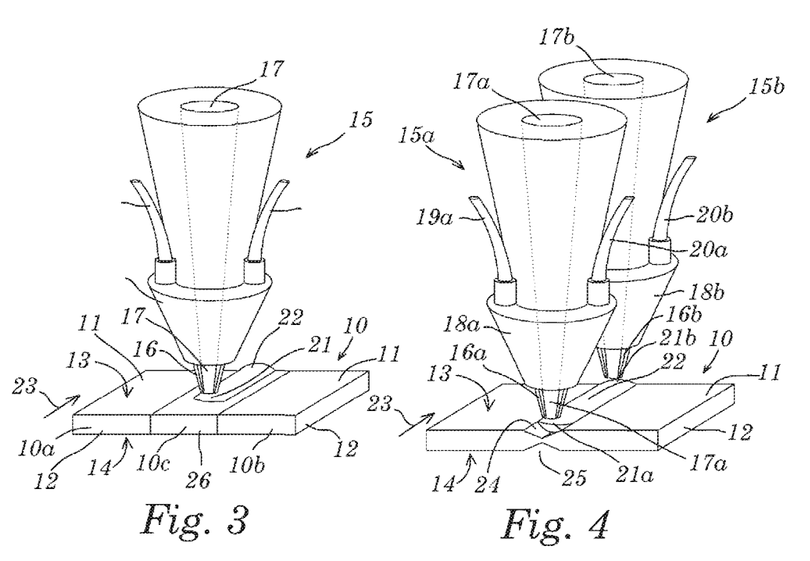
FIG. 3 shows a variant of FIG. 1 in which the sheet-like base is formed as a bimetallic base with a central strip of a different material.
FIG. 4 shows a variant of FIG. 1 or FIG. 2 in which two particulate cutting-edge materials are supplied.

FIG. 3 shows a variant of the embodiment of FIG. 1 in which the sheet-like base 10 is formed as a bimetallic base. The sheet-like base 10 has a main body 11 of base material 12, which is divided into two side strips 10a, 10b. The two side strips 10a, 10b are connected to one another by a central strip 10c of a more resistant material, for example of high-speed steel 26. Such a variant of the base 10 may be produced for example by the method known from the applicant's WO 2006/000256 A1. By analogy with the embodiment of FIG. 1, the base 10 is shown as flat. It goes without saying that the base 10 may be provided in the region of the central strip 10c with upper and/or lower depressions, as described in conjunction with FIG. 2.

In the variant of FIG. 4, various modifications of the embodiment of FIG. 1 or of FIG. 2 are shown. However, the invention is not restricted to the combination of these modifications that is shown, but instead each of the modifications described below may be realized individually or in combination with the variant described in FIG. 3. Thus, a sheet-like base 10 which, by analogy with the variant of FIG. 2, is provided with two depressions 24, 25 is used in the variant of FIG. 4. In the variant shown here, however, the depressions have an angular cross-sectional profile. Furthermore, in the variant of FIG. 4, two welding heads 15a, 15b arranged one behind the other are used instead of one welding head 15. By analogy with the procedure of FIG. 1, the welding head 15a guides a first cutting-edge material 16a into the upper recess 24 and produces a welded connection 22 by means of the laser 17a. With the welding device 15b, a further cutting-edge material 16b may be applied and welded to the first cutting-edge material to produce a multilayered cutting-edge region. If no further cutting-edge material has to be applied, it is also possible to use the laser device 17b of the second welding device 15b, or a similar heat source, for heat-treating the welded connection 22, in order to reduce stresses in the welded connection.

In the representations of FIGS. 1 to 4, particulate cutting-edge material is applied from the upper side 13 to the the sheet-like base 10. Usually, however, a supply of the cutting-edge material from the upper side 13 and the underside 14 of the sheet-like bases, simultaneously or successively, is preferred. For a supply that takes place successively, the arrangement of sheet-like bases 10 may for example be led or twisted over a deflecting roller (not shown), so that the underside 14 shown in FIGS. 1 to 4 is subsequently upwardly directed and the upper side 13 with the already produced welded connection 22 is downwardly directed.

Figures 5, 6:
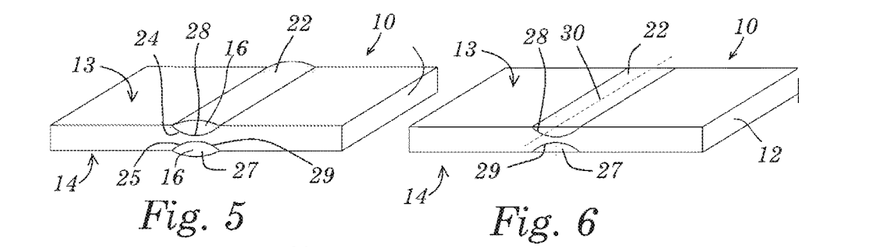
FIG. 5 shows the preliminary material according to the invention from FIG. 1 or FIG. 2 after the welded connection has been established.
FIG. 6 shows the preliminary material according to the invention from FIG. 5 after the flattening of the welded connection.

In FIGS. 5 and 6, the result of the welding process of FIG. 1 or of FIG. 2 is shown, cutting-edge material 16 having been introduced both into the upper depression 24 and into the lower depression 25, so that an upper welded connection 22 and a lower welded connection 27 are formed. In the region of the bottom of the depressions 24, 25, an upper alloying zone 28 and a lower alloying zone 29 are respectively created between the base material and the supplied particulate cutting-edge material 16 as a result of melting of the materials by the laser beam 17. It can be seen that the welded connections 22, 27, which substantially consist of the particulate cutting-edge material 16 supplied and melted, protrude beyond the upper side 13 or underside 14 of the sheet-like base 10, in the form of a weld elevation. In such a case, the welded connections are preferably also flattened, so that a flat composite is obtained, as shown in FIG. 6. Before or as an alternative to the flattening, the weld elevations may possibly also be ground away. In addition or as an alternative to the flattening, the welded connections 22, 27 may also be worked by means of a flattening operation. In this way, a preliminary material that can be processed into special tooth geometries, for example trapezoidal teeth, with less effort than the methods known from the prior art can be produced.

The base 10 is subsequently separated substantially along the welded connections 22, for example along the separating line 30 shown in FIG. 6. After the separation, and possibly further working steps, the preliminary material according to the invention is obtained in the form of two sheet-like bases, advantageously bands, with in each case an edge region that consists substantially of a cutting-edge material (compare FIG. 11 and the associated descriptions further below). The preliminary material according to the invention may be for example two bimetallic bands, which can subsequently be further processed into a machining tool by introducing teeth into the edge region. In the example shown, the separating line 30 is a straight center line through the welded connections 22, 27. However, the separating line may also have a more complicated form and for example be approximated to the desired later form of the teeth. The separation of the sheet-like base into two halves is preferably already carried out during the production of the preliminary material according to the invention, so that two bands each with a cutting edge are created.

Figure 7:
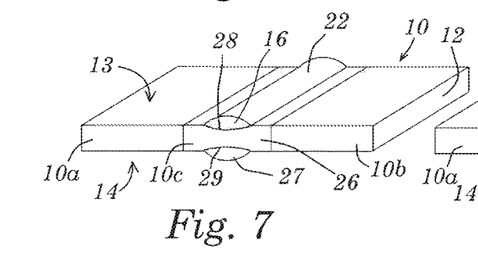
FIG. 7 shows the preliminary material according to the invention from FIG. 3 after the welded connection has been established.
Figure 8:
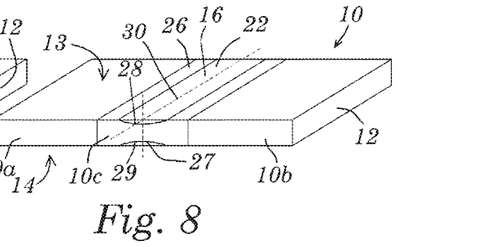
FIG. 8 shows the preliminary material according to the invention from FIG. 7 after the flattening of the welded connection.

In FIGS. 7 and 8, the result of the welding process of FIG. 3 is shown in a way similar to in FIGS. 5 and 6. The particulate cutting-edge material 16 has been applied here to the central strip 10c, preferably consisting of high-speed steel 26, of the base 10 and welded to the high-speed steel. It can be seen that, although the surface of the high-speed steel 26 was flat, the laser welding ensures that the welded connection can penetrate a little into the flat base. Again, an upper welded connection 22 and a lower welded connection 27 with alloying zones 28, 29 have been formed. In FIG. 8, the sheet-like base 10 with the welded connections 22, 27 after the flattening is shown. Here too the base 10 is separated substantially along the welded connections 22, for example along the separating line 30 shown in FIG. 8. A separated half of the base is shown in FIG. 12.

Figure 9:
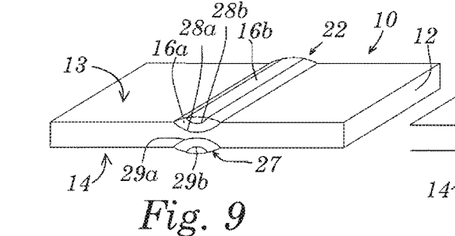
FIG. 9 shows the preliminary material according to the invention from FIG. 4 after the welded connection has been established.
Figure 10:
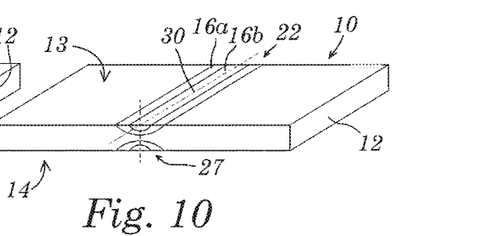
FIG. 10 shows the preliminary material according to the invention from FIG. 9 after the flattening of the welded connection.

In FIGS. 9 and 10, the result of the welding process of FIG. 4 is shown in a way similar to in FIGS. 5 and 6. Here, first a first particulate cutting-edge material 16a was applied and welded to the base material 12 of the sheet-like base 10, so that a first alloying zone 28a was formed between the base material 12 and the first cutting-edge material 16a. A second particulate cutting-edge material 16b was applied to the welded-in cutting-edge material 16a and welded to it while forming an alloying zone 28b, so that a two-layered welding connection 22 is formed. Correspondingly, two layers of particulate cutting-edge material 16a, 16b were applied to the underside 14 of the sheet-like base 10 to form the welded connection 27. In FIG. 10, the sheet-like base 10 with the welded connections 22, 27 after the flattening is shown. Here too the base 10 is separated substantially along the welded connections 22, for example along the separating line 30 shown in FIG. 8. A separated half of the base is shown in FIG. 13.

Figures 11, 12:
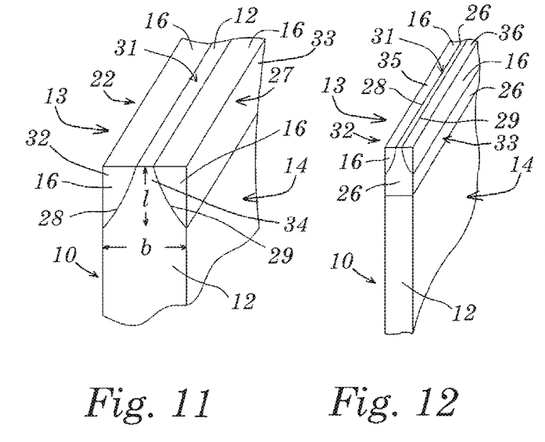
FIG. 11 shows the preliminary material of FIG. 6 after the separation of the welded connection.
FIG. 12 shows the preliminary material of FIG. 8 after the separation of the welded connection.
Figure 13:
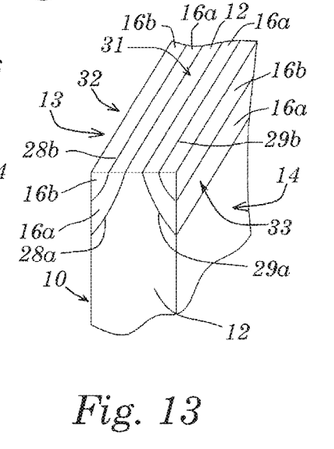
FIG. 13 shows the preliminary material of FIG. 10 after the separation of the welded connection.

In FIGS. 11, 12 and 13, one half of the preliminary materials according to the invention that is created after the cut shown in FIGS. 6, 8 and 10 is in each case shown in cross section.

It can be seen in FIG. 11 that, after the cut along the separating line 30, a cut surface 31 has been created in each of the welded connections 22, 27. In the case of the variant of FIG. 11, base material 12 reaches into the cut surface 31. To the side of that there are cutting-edge regions 32, 33 of the originally particulate cutting-edge material 16. If desired, this base material may be milled out by introducing a groove (not shown), for example a wedge-shaped groove, into the cut surface 31, so that during the later further processing by the saw manufacturer there is no longer any base material in the region of the tips of the teeth. It is characteristic of the method according to the invention, in which the cutting-edge material 16 is applied in the form of powder to the base, that, by contrast with the classic bimetallic band of HSS edge wire, a substantially horizontal weld seam/alloying zone is not created in the cross section of the finished band where the base material 12 and the cutting-edge material 16 go over into one another. Rather, the cutting-edge regions 32, 33 of cutting-edge material 16 reach around a core zone 34 of base material 12. On account of the overlapping of cutting-edge regions 32, 33 of cutting-edge material 16 and base material 12 of the sheet-like base 10, the alloying zones 28, 29 typically do not run horizontally along the height of the finished sheet-like preliminary material as in the case of the classic bimetallic band. The cutting-edge regions 32, 33 of cutting-edge material 16 and the sheet-like base 10 of base material 12 typically overlap in the edge region along the height of the cross section over a length I, which corresponds approximately to 0.2 to 3 times the width b of the sheet-like base 10 in the cross section. In this way, a particularly stable cutting edge is provided.

FIG. 12 shows a view corresponding to the view of FIG. 11 of a preliminary material according to the invention that is obtained after separating the base 10 of FIGS. 7 and 8 along the separating line 30. In comparison with FIG. 11, the multiphase structure of the cutting-edge regions 32, 33 of the preliminary material according to the invention can be clearly seen, also reflected in the cut surface 31. Since the sheet-like base 10 already had originally a main body with strips 10a, 10b of base material 12 and a central strip 10c of a further cutting-edge material 26, the originally particulate cutting-edge material 16, applied by the method according to the invention, already represents the second layer 35, 36 of cutting-edge material. The alloying zones 28, 29 produced by the method according to the invention accordingly run between the cutting-edge material 26 of the sheet-like base 10 and the welded-on, originally particulate cutting-edge material 16. On the teeth of the machining tool that are later fashioned, the second layers 35, 36 of the cutting-edge regions 32, 33 of the finished preliminary material of FIG. 12 accordingly form additionally strengthened corner regions if a still more resistant material than the cutting-edge material 26 is used as the cutting-edge material 16.

FIG. 13 shows a view corresponding to the view of FIG. 11 of a preliminary material according to the invention that is obtained after separating the base 10 of FIGS. 9 and 10 along the separating line 30. Here, the cutting edge regions 32, 33 are of a multilayered structure. On the separated surface there can be seen a central strip of base material 12, which is separated by an alloying zone 28a, 29a from the first cutting-edge material 16a, which in turn is separated by an alloying zone 28b, 29b from the second cutting-edge material 16b. The preliminary material of FIG. 13 is also suitable in particular for producing saw teeth with strengthened corner regions.

Figure 14:
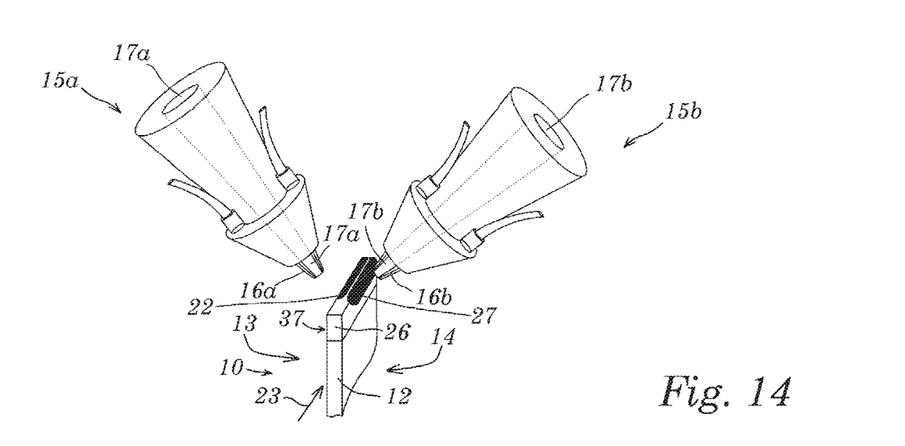
FIG. 14 shows a schematic representation of the application of a particulate cutting-edge material to the cutting edge of a sheet-like base.
Figure 15:
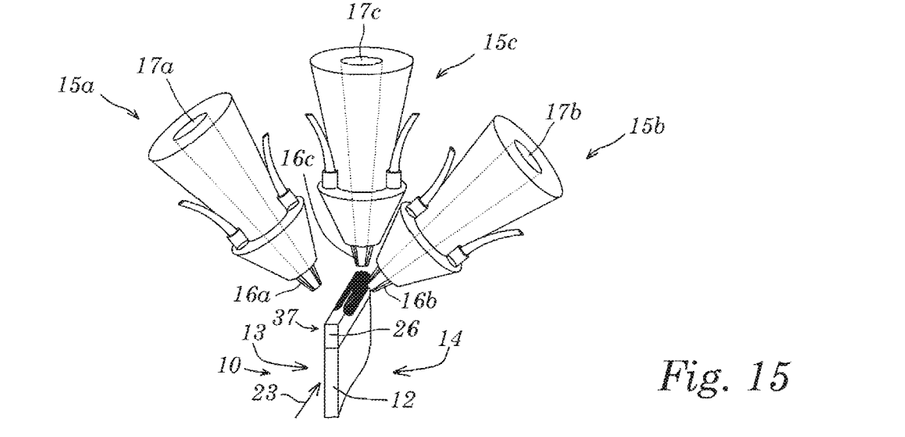
FIG. 15 shows a variant of the method of FIG. 14 in which particulate cutting-edge material is applied from three directions.
Figure 16:
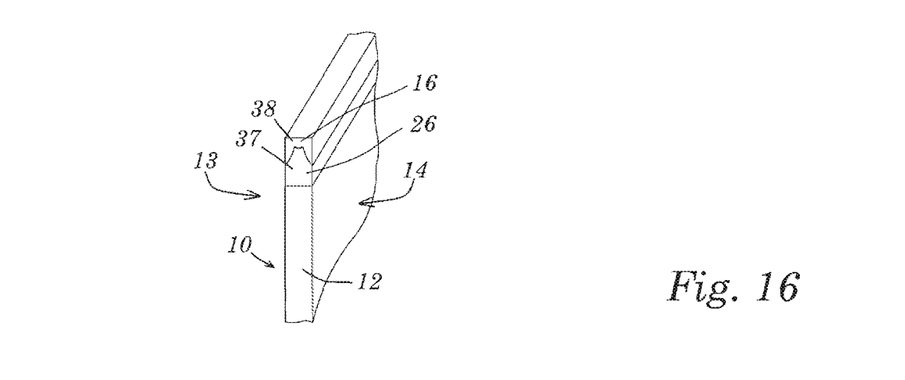
FIG. 16 shows the preliminary material according to the invention from FIG. 15 after working on the edge region.

In FIGS. 14 to 16, an alternative method for producing a preliminary material for a bimetal band with strengthened corners is described. According to FIG. 14, a sheet-like base 10, which comprises a main body of base material 12 and a cutting edge region 37 of cutting-edge material 26, is provided. With two welding heads 15a, 15b, particulate cutting-edge material 16a, 16b is applied to the corners of the cutting-edge region 37 of cutting-edge material 26 of the sheet-like base 10 and welded to the sheet-like base by means of the laser beams 17a, 17b. In the examples shown, the base 10 again consists of band material and during the welding process is moved through under the welding heads along the arrow 23. The cutting-edge region 37 of the sheet-like base 10 may have been produced by the method according to the invention from a first particulate cutting-edge material or it may consist of a further cutting-edge material, which has for example been welded onto the main body as edge wire. According to the variant of FIG. 15, the particulate cutting-edge material is applied not only to the corners of the cutting-edge region 37 of the sheet-like base 10, but also centrally onto the end face of the cutting-edge region 36 of the base 10 as a particle jet 16C by means of a third welding head 15c. With this variant, not only the production of corners with particularly great wear resistance and cutting strength is made possible, but the entire region of the tooth tip has a strengthened tip region 38 with particularly great wear resistance and cutting strength. The particulate cutting-edge materials 16a, 16b, 16c may be the same or different. If the cutting-edge materials 16a, 16b, 16c are the same cutting-edge material 16, the preliminary material shown in FIG. 16 is created, with a base 10 that has a main body of base material 12 and a cutting-edge region 37 of cutting-edge material 26. The tip region 38, which has been applied by the method according to the invention, consists of the originally particulate cutting-edge material 16.

The invention claimed is:

1. A method for producing a preliminary material for a machining tool, or for a saw blade, a saw band, a cutting line, a punching knife or a blade, the method comprising:
    introducing at least a first particulate cutting-edge material in a form of powder or granules into a depression formed on an upper side of a horizontally arranged sheet-like base;
    welding the first particulate cutting-edge material to the upper side of the horizontally arranged sheet-like base;
    turning the horizontally arranged sheet-like base by 180° so that an underside of said sheet-like base faces upwardly;
    introducing said first particulate cutting-edge material in the form of powder or granules into another depression formed on the underside of said sheet-like base;
    welding said first particulate cutting-edge material to the underside of said sheet-like base; and
    separating the sheet-like base along a center line of the welded connection thus separating the sheet-like base substantially along the welded connection thus produced to form at least two sheet-like base portions each comprising the welded first particulate cutting-edge material along an edge thereof.

2. The method as claimed in claim 1, wherein the sheet-like base is a band of metal or metal alloy.

3. The method as claimed in claim 1, wherein the first particulate cutting-edge material is welded to the sheet-like base such that the sheet-like base and/or the first particulate cutting-edge material is/are at least partially melted to form a molten material composite and the molten material composite is left to solidify at least partially.

4. The method as claimed in claim 1, wherein the sheet-like base comprises a main body of a base material.

5. The method as claimed in claim 4, wherein the sheet-like base includes in the base material at least one region of a further cutting-edge material, and the first particulate cutting-edge material is applied to the at least one region.

6. The method as claimed in claim 1,
    wherein the welding comprises forming a composite comprising the sheet-like base and the first particulate cutting-edge material, and
    wherein, before the separating, at least a second particulate cutting-edge material is supplied and melted.

7. The method as claimed in claim 1, wherein the first particulate cutting-edge material includes metals and/or metal alloys.

8. The method as claimed in claim 1, wherein the first particulate cutting-edge material includes metallic hard materials.

9. The method as claimed in claim 1, wherein the sheet-like base and the first particulate cutting-edge material are welded to one another by supplying energy by at least one welding device.

10. The method as claimed in claim 1, wherein the first particulate cutting-edge material is supplied to both sides of the sheet-like base.

11. The method as claimed in claim 1, wherein the forming the depression cut-outs on the upper side and the underside of a sheet-like base further comprises forming said depression cut-outs to have a curved cross-sectional profile or to have an angular cross-sectional profile.

12. A method for producing a preliminary material for a machining tool, or for a saw blade, a saw band, a cutting line, a punching knife or a blade, the method comprising:
    forming depression cut-outs on an upper side and an underside of a sheet-like base;
    introducing at least a first particulate cutting-edge material into said depression cut-outs of said sheet-like base;
    welding the first particulate cutting-edge material to the sheet-like base by a first welding head and forming a first alloying zone between the sheet-like base and the first particulate cutting-edge material;
    introducing at least a second particulate cutting-edge material to the welded-in first particulate cutting-edge material;
    welding the second particulate cutting-edge material by a second welding head and forming a second alloying zone between the first particulate cutting-edge material and the second particulate cutting-edge material, thereby forming a two-layered welded connection; and
    separating the sheet-like base along a center line of the two-layered welded connection to form at least two sheet-like base portions each comprising the welded first and second particulate cutting-edge materials along an edge thereof.

* * * * *